US012777032B2

(12) United States Patent
Murthy et al.

(10) Patent No.: US 12,777,032 B2

(45) Date of Patent: Oct. 27, 2026

(54) USER DEFINED NETWORK ACCESS THAT SUPPORTS ADDRESS ROTATION

(71) Applicant: Cisco Technology, Inc., San Jose, CA (US)

(72) Inventors: Shree N. Murthy, San Jose, CA (US); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 56 days.

(21) Appl. No.: 18/789,099

(22) Filed: Jul. 30, 2024

(65) Prior Publication Data

US 2024/0388581 A1 Nov. 21, 2024

Related U.S. Application Data

(63) Continuation-in-part of application No. 17/856,192, filed on Jul. 1, 2022, now Pat. No. 12,401,642.

(51) Int. Cl.

*H04L 29/06* (2006.01)

*H04L 9/40* (2022.01)

(52) U.S. Cl.

CPC .......... *H04L 63/083* (2013.01); *H04L 63/062* (2013.01)

(58) Field of Classification Search

CPC ................. H04L 63/083; H04L 63/062; H04L 61/5069; H04L 2101/69; H04L 63/102;

(Continued)

(56) References Cited

U.S. PATENT DOCUMENTS 11,246,011 B1 2/2022 Satyanarayana et al.
2017/0195318 A1 7/2017 Liu et al.

(Continued)

FOREIGN PATENT DOCUMENTS

WO 2021023376 A1 2/2021

OTHER PUBLICATIONS

Aboba B., et al., "Extensible Authentication Protocol (EAP)," Network Working Group, Request for Comments: 3748, Obsoletes: 2284, Category: Standards Track, Jun. 2004, pp. 1-67.

(Continued)

*Primary Examiner* — Edward Zee

*Assistant Examiner* — Leynna Truvan

(74) *Attorney, Agent, or Firm* — Edell, Shapiro & Finnan, LLC

(57) ABSTRACT

Methods are provided that support media access control (MAC) address rotation (RCM) by generating a passcode for associating a user defined network by one or more endpoint devices instead of using MAC addresses for their respective device identity. In these methods, a computing device obtains a registration request for establishing a user defined network (UDN) and generates a unique UDN identifier and a unique passcode associated with the unique UDN identifier. The unique passcode enables an authentication of one or more endpoint devices to connect to the UDN. The authentication is independent of the MAC address of a respective endpoint device. The computing device provides the UDN identifier and the unique passcode such that the UDN identifier and the unique passcode are for connecting the one or more endpoint devices to the UDN.

20 Claims, 10 Drawing Sheets

(58) Field of Classification Search

CPC ............. H04L 63/0876; H04L 61/5038; H04L 61/5076; H04L 61/5092; H04L 2101/622; H04L 9/06; H04L 9/0643; H04L 9/3236; H04L 9/3239; H04L 9/3242; H04L 9/40; H04L 2012/6448; H04L 9/32; H04L 63/08; H04L 65/1013; H04H 60/23; H04N 21/25816; H04N 2201/3236; H04Q 2213/13515; G06F 16/137; G06F 16/152; G06F 16/2255; G06F 16/325; G06F 16/9014; G06F 21/44; G06F 21/445; G11B 20/00898; G07B 2017/00774; G03G 21/1892; G06Q 20/3674; G06Q 20/409; G06Q 20/4093; G06Q 20/4097; G06V 20/95

See application file for complete search history.

(56) References Cited

U.S. PATENT DOCUMENTS

| | | | | |
|---|---|---|---|---|
| 2020/0137036 | A1 * | 4/2020 | Woland | H04W 12/08 |
| 2020/0396604 | A1 | 12/2020 | Olshansky et al. | |
| 2021/0099876 | A1 | 4/2021 | Neipris et al. | |
| 2021/0286868 | A1 | 9/2021 | Kragh | |
| 2022/0070172 | A1 | 3/2022 | Muthusamy et al. | |
| 2022/0417742 | A1 * | 12/2022 | Dey | H04W 12/069 |
| 2023/0397007 | A1 | 12/2023 | Wifvesson et al. | |
| 2024/0007468 | A1 | 1/2024 | Murthy et al. | |
| 2024/0031808 | A1 | 1/2024 | Gundavelli et al. | |

OTHER PUBLICATIONS

Aruba: "Device Provisioning Protocol", Aruba, Retrieved from https://www.arubanetworks.com/techdocs/central/2.5.6/content/nms/apps/dpp.htm#:~:text=DPP%20is%20a%20provisioning%20protocol,initiative%20that%20allows%20onboarding%20IoT on Mar. 22, 2024, pp. 1-2.

Cisco: "802.11 Network Security Fundamentals", Chapter 1, Cisco Secure Services Client Administrator Guide, Release 5.1.0, Jul. 7, 2008, pp. 1-14.

Cisco, "Cisco User Defined Network: Network Administrator Experience White Paper", Updated Feb. 10, 2021, 8 pages, https://www.cisco.com/c/en/us/solutions/collateral/enterprise-networks/white-paper-c11-744316.html.

Cisco: "Cisco User Defined Network Plus", Solution Overview Cisco Public, Dec. 5, 2023, Retrieved from https://www.cisco.com/c/en/us/solutions/collateral/enterprise-networks/digital-network-architecture/nb-06-user-defined-nw-so-cte-en.pdf, 3 Pages.

Cisco, "User Defined Network", Prescriptive Deployment Guide, Apr. 2021, 109 pages.

Cisco: "Wi-Fi Personal Network (WPN)", Meraki, May 13, 2024, Retrieved from https://documentation.meraki.com/MR/Encryption_and_Authentication/Wi-Fi_Personal_Network_(WPN), pp. 1-10.

Congdon P., et al., "IEEE 802.1X Remote Authentication Dial In User Service (RADIUS) Usage Guidelines", Network Working Group, Request for Comments: 3580, Sep. 2003, pp. 1-30.

Harkins D., "Wi-Fi Easy Connect™: Simple and Secure Onboarding for IoT", The Beacon, Retrieved from #:https://www.wi-fi.org/beacon/dan-harkins/wi-fi-easy-connect-simple-and-secure-onboarding-for-iot on Mar. 22, 2024, 5 Pages.

Mitchell C., "Identity PSK with Cisco ISE", ModernCyber, Retrieved from https://www.moderncyber.com/blog/ise-ipsk on Mar. 22, 2024, 8 Pages.

Moore T., "Use of EAPOL-Key Messages", doc.: IEEE 802.11-04/534r0, May 2004, pp. 1-6.

Ohba Y., et al., "An EAP Method for Key Distribution Exchange for Handover Re-authentication", draft-ohba-eap-kde-01, Feb. 22, 2008, pp. 1-11.

"Randomized and Changing Mac Deployment Guide", Cisco, https://www.cisco.com/c/en/us/products/collateral/wireless/randomized-changing-mac-dg.html, Retrieved Mar. 4, 2022, 62 pages.

SplashAccess: "Cisco Meraki IPSK for Campus & Higher Education", Splash Access, Retrieved from https://www.splashaccess.com/portfolio/cisco-meraki-ipsk-solution/ on Mar. 22, 2024, 9 Pages.

Venkateswaran R.T., et al., "Agentless Quarantine of Network Endpoints", Technical Disclosure Commons, Defensive Publications Series, Apr. 2022, pp. 1-6.

Final Office Action for U.S. Appl. No. 17/856,192, mailed Oct. 16, 2024, 20 Pages.

Non-Final Office Action for U.S. Appl. No. 17/856,192, mailed Mar. 25, 2024, 13 pages.

* cited by examiner

900

USER DEFINED NETWORK ACCESS THAT SUPPORTS ADDRESS ROTATION

PRIORITY CLAIM

This application is a continuation-in-part and claims the benefit of priority to U.S. patent application Ser. No. 17/856,192, filed on Jul. 1, 2022, now U.S. Pat. No. 12,401,642, issued on Aug. 26, 2025, the entirety of which application is incorporated herein by reference.

TECHNICAL FIELD

The present disclosure generally relates to data and communication networks.

BACKGROUND

When sharing a network by multiple users, network segmentation may be used for security and enhanced control of the user devices. For example, a User Defined Network (UDN) allows the users to create their own personal network (a network segment) that would include only their devices. The user may invite other trusted users into their personal network, sometimes referred to as a private room. This provides the user with security and ability to control the sharing of their devices. The user registers their devices to the private room by inputting a Media Access Control (MAC) address of the respective device, which is then associated with the personal network. In the UDN, communication is allowed only between the registered devices.

DESCRIPTION OF EXAMPLE EMBODIMENTS

Overview

Figure 1:
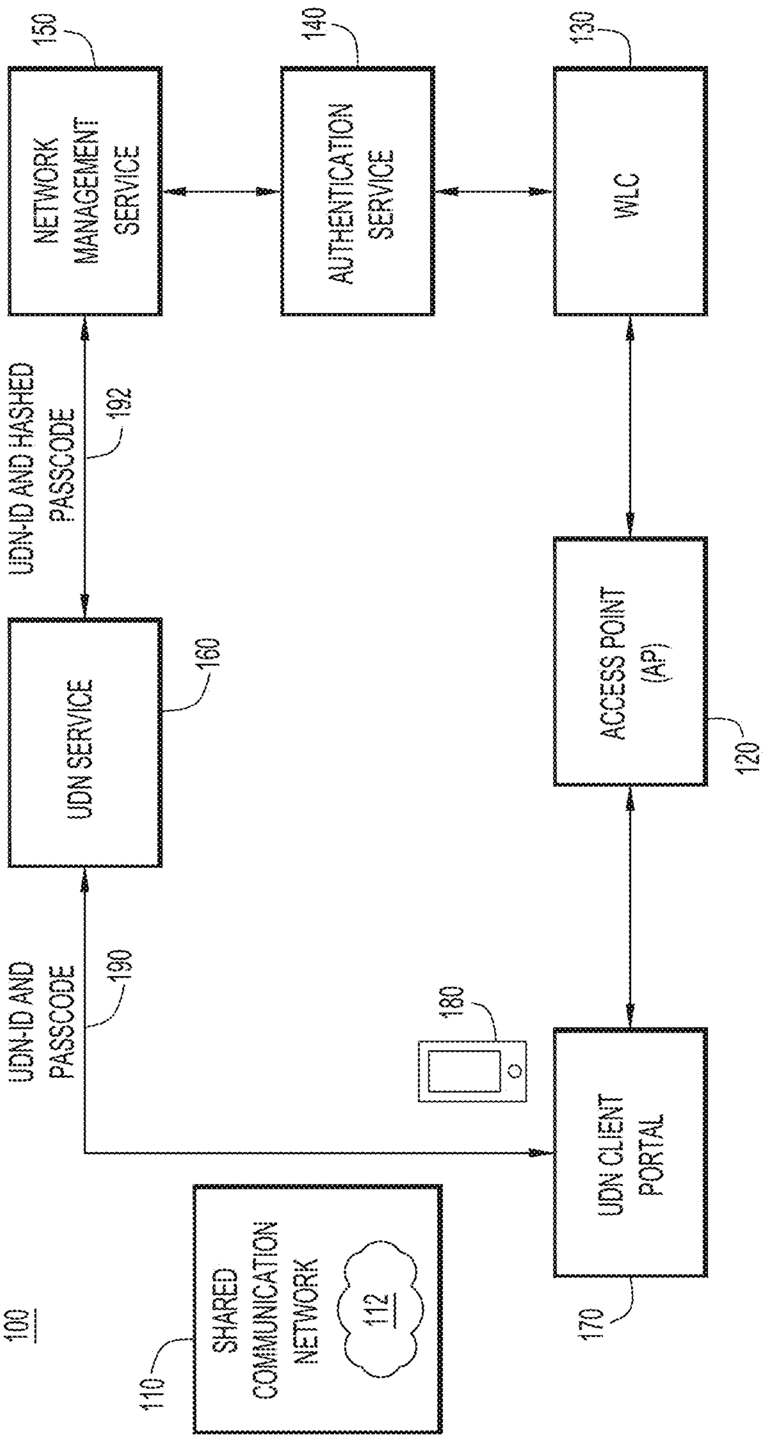
FIG. 1 is a block diagram illustrating a system configured to authenticate one or more endpoint devices onto the UDN using a unique passcode, according to an example embodiment.

A mechanism is presented herein that supports media access control (MAC) address rotation (RCM) by generating a passcode for accessing a user defined network by one or more endpoint devices instead of using MAC addresses for their respective device identity.

In one form, a computing device, obtains a registration request for establishing a user defined network (UDN) and generates a UDN identifier and a unique passcode associated with the UDN identifier. The unique passcode enables an authentication of one or more endpoint devices to connect to the UDN. The authentication is independent of a media access control (MAC) address of a respective endpoint device. The computing device provides the UDN identifier and the unique passcode such that the UDN identifier and the unique passcode are provided to the one or more endpoint devices to connect to the UDN.

In another form, a network device, obtains, from an endpoint device, a unique passcode associated with a user defined network (UDN). The network device establishes a connection for the endpoint device to a communication network. The UDN is a portion of the communication network segmented for a user of the endpoint device. The network device generates a hash of the unique passcode and provides the hash, to an authentication server. The authentication server authenticates the endpoint device onto the UDN based on the hash without using a media access control (MAC) address of the endpoint device. The network device further obtains, from the authentication server, a UDN identifier associated with the hash and connects the endpoint device to the UDN based on the UDN identifier.

In another form, a network device obtains, from an endpoint device, a hash of a unique passcode (e.g., a hash of a room-name or group identifier) associated with a user defined network (UDN) in which the network device is to establish a connection for the endpoint device to a communication network and in which the UDN is a portion of the communication network segmented for a user of the endpoint device. The network device may provide the hash of the unique passcode to an authentication server in which the authentication server is to perform an authentication of the endpoint device to connect to the UDN based on the hash of the unique passcode and the authentication is independent of a media access control (MAC) address of the endpoint device. The network device may obtain, from the authentication server, a unique UDN identifier associated with the hash of the unique passcode and may connect the endpoint device to the UDN based on the unique UDN identifier. Thus, the authentication server can authenticate the endpoint device to connect to the UDN based on the hash of the unique passcode and independent of a unique identity, such as the MAC address, of the endpoint device.

Example Embodiments

The UDN uses MAC address of the respective device as a unique device identifier. For example, the user logs into a mobile application, a web portal, or other mechanism (referred to as a UDN client portal), using credentials provided by an enterprise network (referred to as a shared communication network). The user may then manually input MAC address of their devices and invite other users to be a part of their private network segment. A UDN cloud service then assigns the registered devices of the user to their personal network and stores the MAC addresses with the unique identity of the private network segment (referred to as a UDN identifier (UDN-ID)).

Network devices such as a wireless local access network (LAN) controller (WLC) and access points (APs), use the UDN-ID to enforce traffic containment for the traffic generated by the registered endpoint devices. By performing MAC address filtering, traffic containment policies are enforced. For example, unicast traffic between two different personal networks is blocked.

The UDN functions are based on the uniqueness of the MAC address for the respective endpoint device. Rotating/randomized changing of the MAC addresses (RCM) support on the endpoint devices creates challenges for the UDN functions because the uniqueness of the MAC address as an identity of the device is lost. In other words, each time a MAC address rotation occurs (an RCM event), the endpoint device needs to be re-authenticated onto the UDN.

Further, some operating systems of the endpoint devices disable applications from fetching the MAC address through an application programming interface (API). As such, using the MAC address as the unique identity of the endpoint device is becoming increasingly more difficult.

In one or more example embodiments, techniques are provided in which a unique passcode is generated and is associated with the UDN-ID. The unique passcode is used by various endpoint devices instead of their MAC address. In these techniques, a unique passcode is generated per UDN-ID and is used for authenticating user's endpoint devices onto a personal network segment (UDN) irrespective of their MAC addresses and/or MAC addresses changes. These techniques are also applicable to endpoint devices that use pre-shared key (PSK), identity PSK (iPSK), simultaneous authentication of equals (SAE) based authentication in the UDN. These techniques adapt to the changing MAC addresses of the endpoint devices when the respective endpoint device on-boards onto a network in the context of the UDN using a PSK based authentication mechanism. Because the unique passcode is assigned to each private room in addition to the UDN-ID, unique identity of the respective endpoint device is no longer needed for authenticating the endpoint device onto the UDN.

While example embodiments describe generating one UDN (private room, personal network, etc.), it is understood that a number of UDNs and private rooms being generated are not limited to one and may vary based on a particular deployment of the network and use case scenario.

FIG. 1 is a block diagram illustrating a system 100 configured to authenticate one or more endpoint devices onto the UDN using a unique passcode, according to an example embodiment.

The system 100 includes a shared communication network 110, one or more access points depicted as an access point (AP) 120, wireless local area network (LAN) controller (WLC) 130, an authentication service 140, a network management service 150, a UDN service 160, a UDN client portal 170 that communicates with one or more endpoint devices that are depicted as an endpoint device 180.

This is only an example of the system 100, and the number and types of entities may vary based on a particular deployment and use case scenario, such as the type of service being provided and network structures. For example, while the system 100 includes the AP 120, other network devices may be present in the system 100. The network devices may include, but are not limited to switches, virtual routers, leaf nodes, spine nodes, etc.

In various example embodiments, the entities of the system 100 (endpoint device 180, UDN service 160, network management service 150, authentication service 140, the WLC 130, and the AP 120) may each include a network interface, at least one processor, and a memory. Each entity may be an apparatus or any programmable electronic device capable of executing computer readable program instructions. The network interface may include one or more network interface cards (having one or more ports) that enable components of the entity to send and receive packets or data over the network(s), such as a local area network (LAN) or a wide area network (WAN), and/or wireless access networks such as the shared communication network 110. Each entity may include internal and external hardware components such as those depicted and described in further detail in FIG. 7. In one example, at least some of these entities may be embodied as virtual devices with functionality distributed over a number of hardware devices, such as virtual APs, switches, routers, servers, etc.

The endpoint device 180 is any suitable device configured to initiate a flow in the system 100, such as data source device and/or data sink device. For example, the endpoint device 180 may include a computer, an enterprise device, an appliance, an Internet of Things (IoT) device, a Personal Digital Assistant (PDA), a laptop or electronic notebook, a smartphone, a tablet, and/or any other device and/or combination of devices, components, elements, and/or objects capable of initiating voice, audio, video, media, or data exchanges within the system 100. The endpoint device 180 may also include any suitable interface to a human user such as a microphone, a display, a keyboard, or other terminal equipment. The endpoint device 180 may be configured with appropriate hardware (e.g., processor(s), memory element(s), antennas and/or antenna arrays, baseband processors (modems), and/or the like such as those depicted and described in further detail in FIG. 7), software, logic, and/or the like to facilitate respective Over-the-Air (OTA) interfaces for accessing/connecting to the AP 120 and sending or receiving packets.

The endpoint device 180 is configured to connect the user to the UDN client portal 170 such as a mobile application executing on the endpoint device 180 or a web portal accessible via the endpoint device 180. Using the UDN client portal 170, the user registers one or more of their endpoint devices for the UDN 112 (private room) and invites other users to join the private room, as detailed below.

To onboard onto the shared communication network 110, the endpoint device 180 is connected to (establishes an association with) the AP 120. The endpoint device 180 and the AP 120 may represent a wireless infrastructure that provides Wireless Local Area Network (WLAN) coverage for a specific geographic area/location. For example, wireless infrastructure may serve an airport, a shopping mall, a train station, a venue, etc. The endpoint device 180 and the AP 120 may use various wireless access network protocols, such as the Wi-Fi® wireless technology, to send and receive various packets. In one example, the endpoint device 180 may be configured to connect to a WLAN (e.g., through the AP 120), and initially, may be part of the shared communication network 110 (e.g., a Wi-Fi® network offered in a corporate, enterprise, or dorm room environment).

The AP 120 may be WLAN APs configured with appropriate hardware (e.g., processor(s), memory element(s), antennas and/or antenna arrays, baseband processors (modems), and/or the like), software, logic, and/or the like to provide OTA coverage for a WLAN access network (e.g., Wi-Fi®). In various example embodiments, the AP 120 may be implemented as Wi-Fi access point (AP) and/or the like. The AP 120 may be configured with appropriate hardware (e.g., processor(s), memory element(s), antennas and/or antenna arrays, baseband processors (modems), and/or the like), software, logic, and/or the like to facilitate respective OTA interfaces for accessing/connecting to the endpoint device 180 (to send and receive packets) and for communicating with the network management service 150 (to send and receive packets) and the UDN service 160. The AP 120 may be managed or controlled by the network management service 150 and/or the WLC 130. The AP 120 is connected to the WLC 130 via the LAN/WAN to send and receive data or packets.

The WLC 130 may be a control plane entity that provides or is responsible for WLAN functions such as WLAN-based access authentication services, authorization services, intrusion prevention, Radio Frequency (RF) management, and/or the like to facilitate the endpoint device 180 connectivity via the AP 120. In one form, the WLC 130 may be a software process running on one or more servers in a cloud (on any server in a datacenter or at any location with Internet connectivity). The WLC 130 is configured with appropriate hardware (e.g., processor(s), memory element(s), and/or the like such as those depicted and described in further detail in FIG. 7), software, logic, and/or the like.

The AP 120 and the WLC 130 are network devices that enable traffic containment within the UDN 112 using a UDN-ID and an associated unique passcode. The UDN 112 is a personal, secure network, a private network, a network segment dedicated to the user, or a private room within the shared communication network 110. The user may create the UDN 112 and add the endpoint devices (e.g., the endpoint device 180) thereto using the UDN client portal 170, such as a mobile application downloadable to the endpoint device 180. The UDN client portal 170 may cause the endpoint device 180 to scan the shared communication network 110 for shareable endpoint devices and display an indication of such endpoint devices in a form of a list, for example. The user selects the one or more endpoint devices to add to UDN 112. Hence, the UDN 112 includes the registered devices of the user.

Further, the AP 120 and/or the WLC 130 may perform MAC address rotation for the endpoint device 180, at a preset time interval (each epoch), and/or for each endpoint device 180 associated with it (respective SSID). In one form, the MAC address rotation may be performed at a request of the endpoint device 180 and/or at the direction of the network management service 150. MAC address rotation involves assigning one or more new MAC addresses to the respective endpoint device 180. The MAC address rotation is performed by the end-point device 180 itself but may be initiated by the AP 120 and/or WLC 130.

In one or more example embodiments, the WLC 130 communicates with an authentication service 140 to perform authentication of the endpoint device 180. The WLC facilitates and controls connectivity of the endpoint device 180 via the AP 120. The authentication service 140, embodied by one or more hardware computing devices, may include at least part of one or more of a digital network architecture, identity services engine (ISE), Policy Control Function (PCF), an authentication, authorization, and accounting (AAA) service, etc. The authentication service 140 communicates with the network management service 150 to authenticate the user onto the shared communication network 110 i.e., the UDN 112 of the shared communication network 110.

The network management service 150 may be a management device(s) or software process associated with wireless infrastructure. In one form, the network management service 150 may be an on-premise device(s) that connects with the UDN service 160 to provision the shared communication network 110 and to provide visibility through telemetry and assurance data. In another form, the network management service 150 may be a software process running on one or more servers in a cloud (on any server in a datacenter or at any location with Internet connectivity). The network management service 150 is configured with appropriate hardware (e.g., processor(s), memory element(s), and/or the like such as those depicted and described in further detail in FIG. 7), software, logic, and/or the like.

The network management service 150 communicates with the UDN service 160 and the authentication service 140 to register the endpoint device 180 onto the UDN 112 and/or to onboard the endpoint device 180 onto the shared communication network 110. In one example, the network management service 150 may communicate directly with the WLC 130 using a Remote Authentication Dial-In User Service (RADIUS) network protocol. While the authentication service 140 and the network management service 150 are depicted as separate entities, in one or more example embodiments, these entities may be embodied into an integrated service.

The UDN service 160 renders the endpoint device 180 undiscoverable to other endpoint devices that are outside the UDN 112 as defined by the UDN-ID. This may be useful for protecting the security of the endpoint device 180. The user selects one or more endpoint devices such as the endpoint device 180 to add to the UDN 112. The UDN service 160 generates the UDN-ID and the unique passcode and at 190, provides the UDN-ID and passcode to the UDN client portal 170, which then disseminates the UDN-ID and passcode to the registered endpoint devices. In other words, the UDN client portal provisions the registered endpoint devices using a device provisioning protocol to connect to the UDN.

The UDN service 160 is further configured to generate a hash of the passcode. At 192, the UDN-ID and the hashed passcode are provided to the network management service 150. The network management service 150 is configured to communicate with the authentication service 140 and optionally, the WLC 130 to provide the information about the UDN 112 (the UDN-ID and the hashed passcode). Instead of the MAC addresses being used as an identification of the registered endpoint devices, the passcode is used as the identity of the endpoint devices i.e., to indicate that these endpoint devices are members of the UDN 112, as explained in further detail below.

Figure 2:
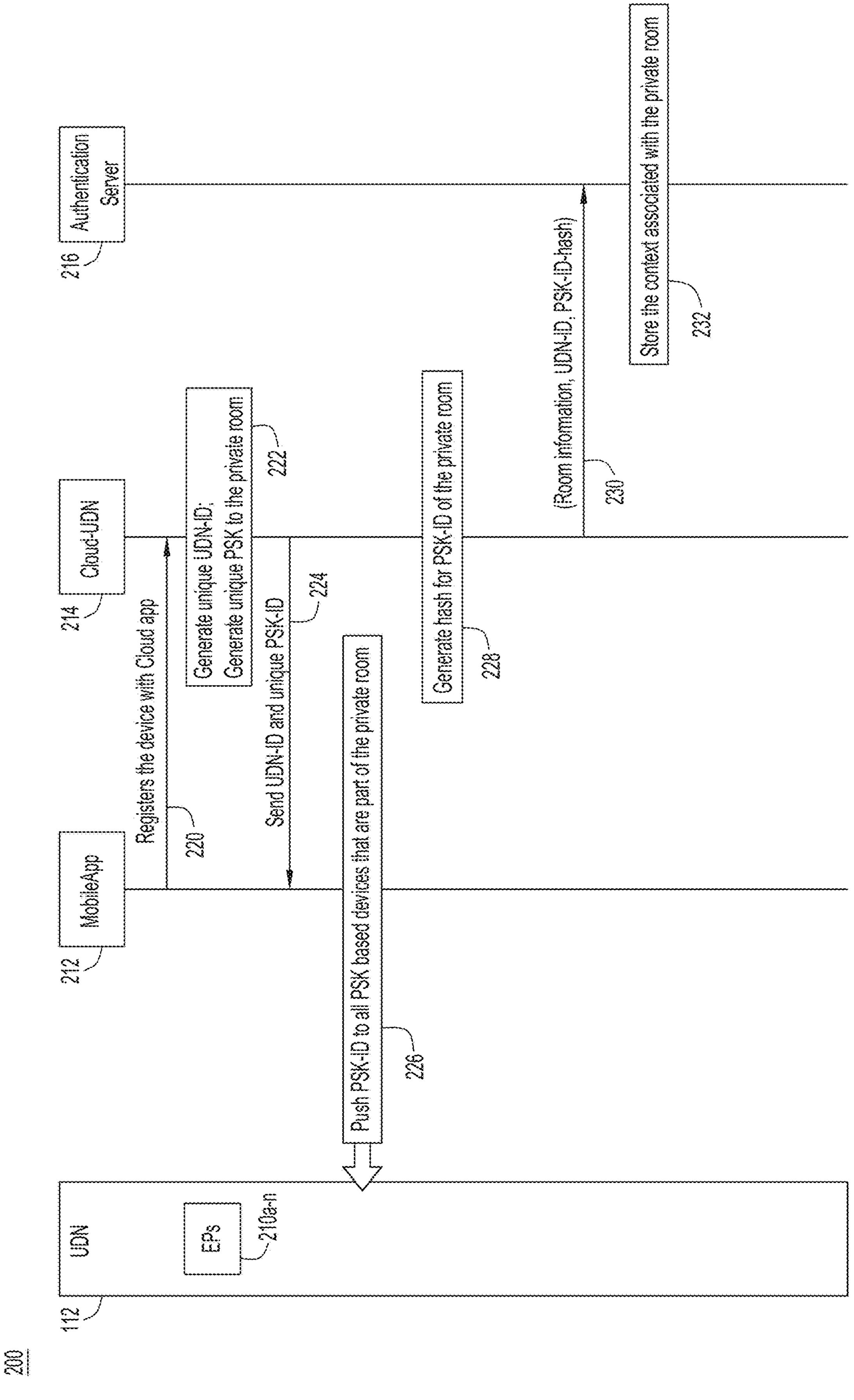
FIG. 2 is a flow diagram illustrating a UDN registration process, according to an example embodiment.
Figure 3:
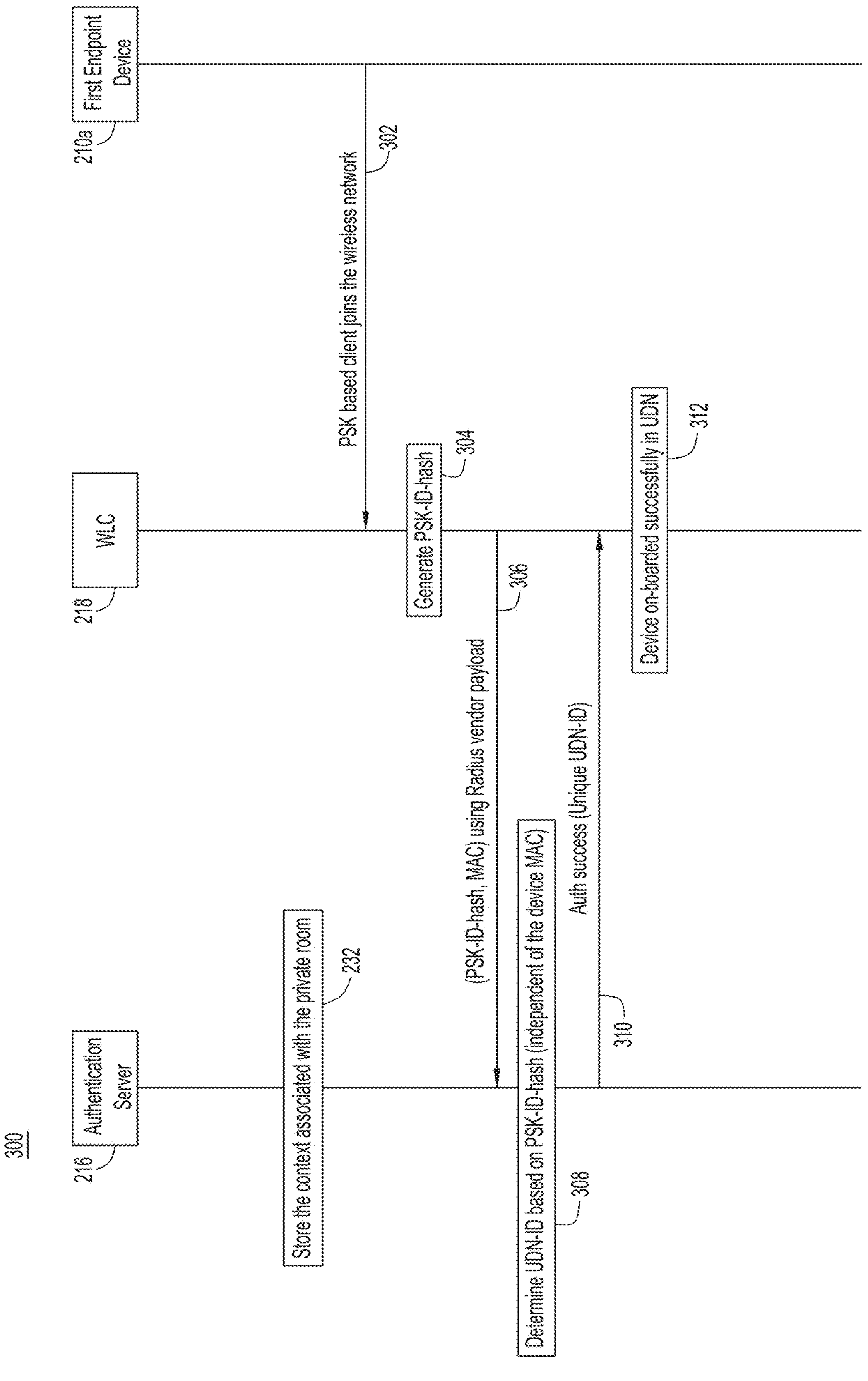
FIG. 3 is a flow diagram illustrating a process of onboarding an endpoint device onto a UDN network, according to an example embodiment.
Figure 4:
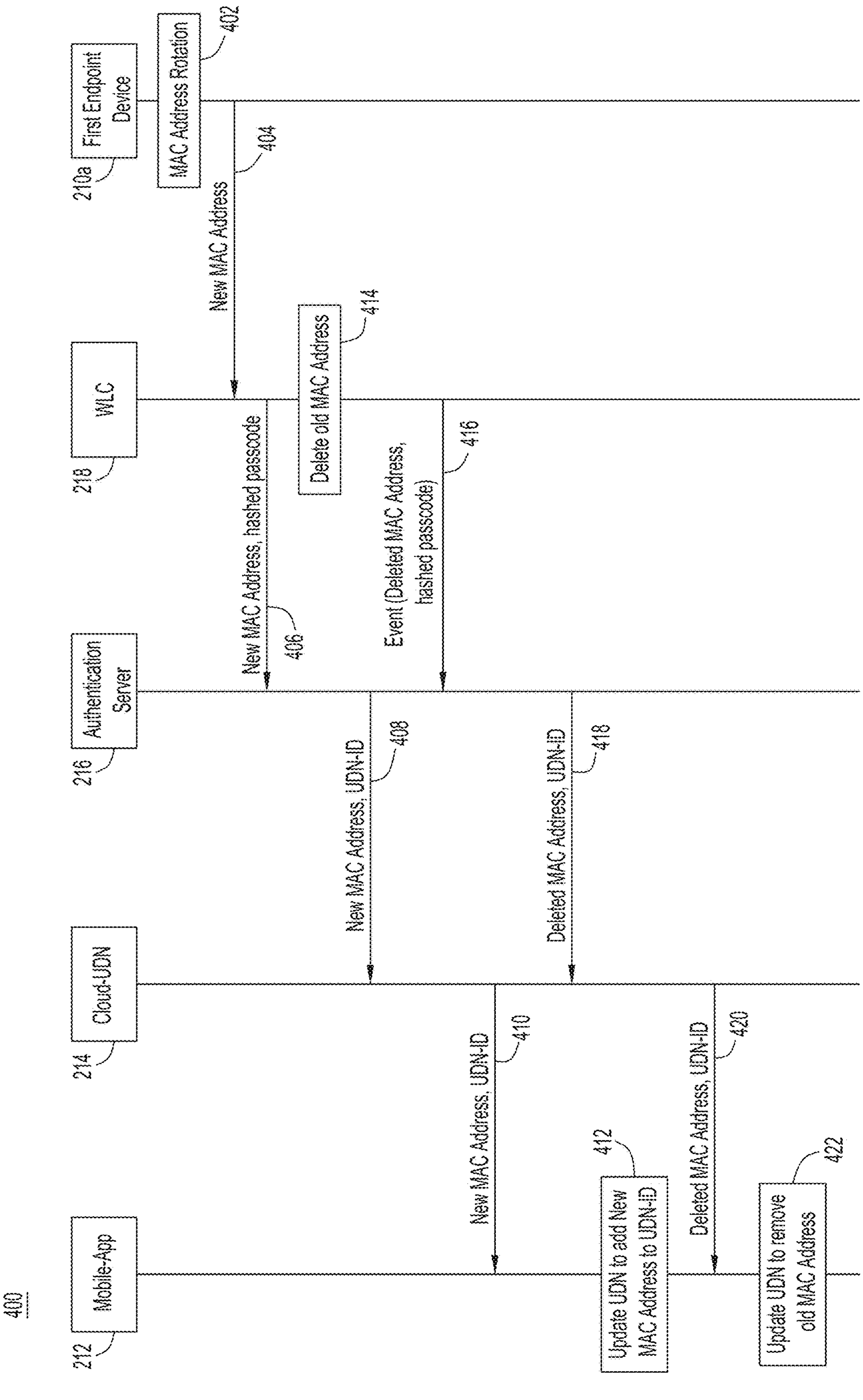
FIG. 4 is a flow diagram illustrating a process of updating UDN information at a UDN client portal based on a MAC address rotation, according to an example embodiment.

With continued reference to FIG. 1, reference is now made to FIGS. 2-4, which illustrate various UDN processes, according to one or more example embodiments. The UDN processes involve various network entities. For example, various network entities include one or more endpoint devices 210*a*-*n* (EPs 210*a*-*n*) that are registered for the UDN 112 of FIG. 1. The network entities further include a mobile application (mobile app) 212, which is an example of the UDN client portal 170 of FIG. 1 and a cloud-UDN 214, which is an example of the UDN service 160 of FIG. 1. The network entities further include an authentication server 216. The authentication server 216 is an example of integrated network management service 150 and authentication service 140. The network entities further include the WLC 218 such as the WLC 130 of FIG. 1.

The notation "a-n" denotes that a number is not limited, can vary widely, and depends on a particular use case scenario, and need not be the same, in number, for the endpoint devices, APs, etc.

Specifically, FIG. 2 is a flow diagram illustrating a UDN registration process 200 in which a unique passcode is generated for each private room in addition to the unique UDN-ID, according to an example embodiment.

The UDN registration process 200 involves at 220, the mobile app 212 registers the device (one of the EPs 210*a-n*) for the UDN 112. Specifically, the device on which the mobile app 212 is executing, sends a registration request to the cloud-UDN 214.

At 222, the cloud-UDN 214 generates a unique UDN-ID for the UDN 112 and a unique passcode that is associated with the private room (the UDN 112). The unique passcode is a unique value that is associated with and linked to the UDN-ID. As such, all EPs 210*a-n* that are to be part of the UDN 112 use this unique passcode (instead of their MAC addresses) to join the UDN 112. The passcode enables the EPs 210*a-n* to join the UDN 112 regardless of their MAC addresses and/or MAC address changes. The unique passcode may be a passphrase or a pre-shared key (PSK). The passphrase and/or the PSK is generated as a function of the UDN-ID e.g., function (UDN-ID). The passcode is a unique string of characters that may be used to generate encryption keys. In other words, while the MAC address is included in the packet, the MAC address is not used for an assignment of an EP to the UDN 112. In one example embodiment, when the UDN-ID is generated, the UDN-ID is used as input to a function to generate the passcode.

At 224, the generated UDN information is pushed from the cloud-UDN 214 to the mobile app 212. The UDN information includes the generated UDN-ID and unique passcode.

At 226, the mobile app 212 pushes the generated passcode (passphrase or PSK) to the EPs 210*a-n* using various mechanisms such as a device provisioning protocol (DPP). For example, PSK-ID (one example of the passcode) is provided to PSK-based endpoint devices that are to be part of the private room/the UDN 112. That is, the mobile app 212 provisions the EPs 210*a-n* to connect to the UDN 112. The UDN 112 is a portion of the common communication network segmented for the user.

Additionally, at 228, the cloud-UDN 214 hashes the unique passcode of the private room/the UDN 112. For example, the cloud-UDN 214 generates a hash over the auto-generated PSK-ID for each private room or generates a hash from the UDN-ID and PSK-ID binding. At 230, the cloud-UDN 214 communicates UDN information to the authentication server 216. For example, the UDN information includes a hash of the PSK-ID, the UDN-ID, and other information for the private room/the UDN 112. The other information may include user related information (user profile). At 232, the authentication server 216 stores the UDN-ID and the hash of the unique passcode (e.g., the PSK-hash) for the private room/the UDN 112 in its datastore. The UDN-ID and the hash are stored in association with one another along with other information about the UDN 112 such as traffic constraint policies, user profile, etc.

When a user wants to invite another trusted user to join the UDN 112, the user, using the mobile app 212, generates an invitation to join for the other trusted user. The other trusted user obtains the invitation via the cloud-UDN 214. If the trusted user accepts the invitation, the cloud-UDN 214 pushes the unique passcode (PSK-ID) to the endpoint device of the trusted user. The endpoint device of the trusted user then connects to the UDN using the unique passcode, as described below.

FIG. 3 is a flow diagram illustrating a process 300 of onboarding a first endpoint device 210*a* onto a UDN, according to an example embodiment. The first endpoint device 210*a* may be a device of the user that is executing the mobile app 212, may be another endpoint device of the user, or may be an endpoint device of the trusted user that was invited to join the UDN.

The onboarding process 300 includes at 302, the first endpoint device 210*a* joining a wireless network. In one example, the first endpoint device 210*a* is PSK enabled client device and the wireless network is an example of the shared communication network 110 of FIG. 1 such as a Wi-Fi® network offered in a corporate enterprise or shared environment (dorm room environment, multi-dwelling building units, etc.). The AP 120 of FIG. 1 and/or the WLC 218 may use the MAC address of the first endpoint device 210*a* to authenticate the first endpoint device 210*a* onto the common wireless network. The first endpoint device 210*a* further uses the unique passcode such as the auto-generated PSK, to join the UDN 112 of FIGS. 1 and 2 of the common wireless network.

Specifically, in response to receiving the unique passcode from the first endpoint device 210*a* (via the AP 120 of FIG. 1), at 304, the WLC 218 generates a hash of the unique passcode. That is, the WLC 218 generates a PSK-hash using the same algorithm that is used by the cloud-UDN 214 at 228 of FIG. 2. At 306, the WLC 218 sends the generated hash, as a vendor payload in the RADIUS message, for example, to the authentication server 216 along with the MAC address of the first endpoint device 210*a*.

The authentication server 216 authenticates the first endpoint device 210*a*. At 308, based on the PSK-hash, the authentication server 216 further determines the UDN-ID that corresponds the PSK-hash (independent of the MAC address). That is, the authentication server 216 compares the PSK-hash with hashes stored in its datastore/database to find a match. If a match is found, the authentication server 216 retrieves a corresponding UDN-ID that is mapped to the PSK-hash. In other words, regardless of the MAC address of the first endpoint device 210*a* (even after the MAC address of the first endpoint device 210*a* is rotated), the authentication server 216 determines the UDN-ID that is associated with the PSK-hash. At 310, in response to a successful authentication of the first endpoint device 210*a*, the authentication server 216 transmits to the WLC 218, an authentication success message that includes the UDN-ID along with other attributes. The authentication success message is provided using defined RADIUS attributes, for example.

In one example, the WLC 218 and the authentication server 216 communicate with each other using the RADIUS protocol. The WLC 218 generates RADIUS request messages with information required for an authentication of the user and/or the first endpoint device 210*a*. The information may be provided in the vendor payload. The authentication server 216 provides RADIUS responses that include the UDN identifier as one of a plurality of pre-defined RADIUS attributes.

At 312, the WLC 218 successfully onboards the first endpoint device 210*a* and enforces required traffic containment on the first endpoint device 210*a*. That is, the WLC 218 puts the first endpoint device 210*a* into the private room based on the UDN-ID. The WLC 218 then applies one or more traffic constraint policies associated with the UDN on one or more network packets obtained for the first endpoint device 210*a*.

FIG. 4 is a flow diagram illustrating a process 400 of updating UDN information at a UDN client portal based on a MAC address rotation, according to an example embodiment.

At 402, the first endpoint device 210*a* joins another SSID or rotates the MAC address. The new MAC address is then on-boarded onto the common wireless network. Specifically, at 404, the new MAC address is propagated from the first endpoint device 210*a* to the WLC 218. The WLC 218 updates its records and associates the new MAC address with the common wireless network. Additionally, the WLC 218 generates a hash of the passcode associated with the private room of the first endpoint device 210*a* and at 406, the WLC 218 provides the new MAC address and the hashed passcode to the authentication server 216. The authentication server 216 sends access-accept to the WLC 218 to on-board the first endpoint device 210*a*.

The authentication server 216 determines the UDN-ID that is associated with the hashed passcode and at 408, the new MAC address along with the retrieved UDN-ID is propagated from the authentication server 216 to the cloud-UDN 214. At 410, the new MAC address along with the UDN-ID is propagated from the cloud-UDN 214 to the mobile app 212. At 412, the mobile app 212 adds the new MAC address to the private room identified by the UDN-ID. The mobile app 212 may further show or display the new MAC address that has joined the private room.

To ensure that the old MAC address is removed from the private room/the UDN (after the MAC address has been rotated), various mechanisms may be used such as a Dynamic Host Configuration Protocol (DHCP) scavenger timers.

For example, at 414, the WLC 218 deletes the old MAC address in response to MAC address rotation and/or after an idle time period. In response thereto, at 416, MAC address event is generated and provided to the authentication server 216. That is, the event includes the deleted MAC address and a corresponding hashed passcode. The authentication server 216 determines the UDN-ID based on the hashed passcode and at 418, notifies the cloud-UDN 214 of the deleted MAC address associated with the UDN-ID. At 420, the cloud-UDN 214 provides the deleted MAC address with the UDN-ID to the mobile app 212. At 422, the mobile app 212 removes the corresponding entry from the private room/UDN i.e., the old MAC address is removed from the UDN. That is, the mobile app 212 updates the MAC address information by adding new MAC address of the first endpoint device 210*a* and deleting the old MAC address of the first endpoint device 210*a*.

MAC address information is propagated from the WLC 218 to the mobile app 212 such that MAC addresses of the endpoint devices are managed by the mobile app 212 and are not required by the cloud-UDN 214. That is, any RCM methods coupled with a PSK based authenticated endpoint device are supported using the passcode instead of the MAC address authentication. Additionally, when an endpoint device joins another UDN enabled SSID after the initial on-boarding, the MAC address is not needed, and a sharable passcode is used instead. In other words, the endpoint device need not re-authenticate onto the UDN with the new MAC address and may skip the secondary authentication. Even if the MAC address has changed, the endpoint device remains connected to the UDN. Since UDN authentication is independent of the identity of the endpoint device, re-association with the UDN is no longer needed.

RCM and the lack of stable identifiers creates challenges with establishing policies for PSK networks. However, the technique presented herein use the UDN-ID to generate a unique passcode per UDN-ID that enables an authentication of the endpoint devices with the network irrespective of their identities (e.g., MAC addresses). Rotating or randomizing identities of the endpoint devices does not influence their connections to the UDN.

Figure 5:
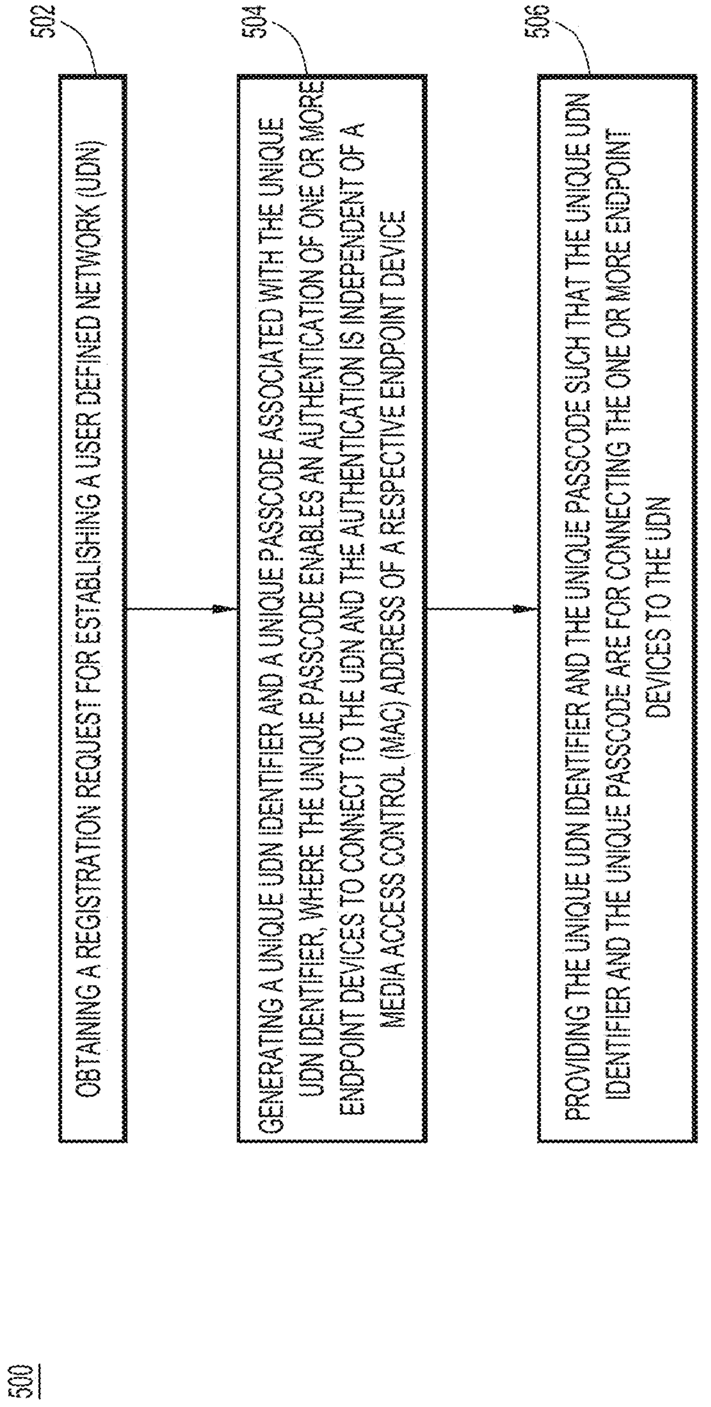
FIG. 5 is a flow diagram illustrating a method of generating a unique passcode that is used instead of a media access control (MAC) address to connect an endpoint device to the UDN, according to an example embodiment.

FIG. 5 is a flow diagram illustrating a method 500 of generating a unique passcode that is used instead of a MAC address to connect an endpoint device to the UDN, according to an example embodiment. The method 500 may be performed by a computing device such as one or more servers of the UDN service 160 of FIG. 1 or the cloud-UDN 214 of FIGS. 2 and 4.

The method 500 involves, at 502, obtaining a registration request for establishing a user defined network (UDN) and at 504, generating a UDN identifier and a unique passcode associated with the UDN identifier. The unique passcode enables an authentication of one or more endpoint devices to connect to the UDN. The authentication is independent of the MAC address of a respective endpoint device.

The method 500 further involves at 506, providing the UDN identifier and the unique passcode such that the UDN identifier and the unique passcode are provided to the one or more endpoint devices to connect to the UDN.

In one instance, the registration request, obtained at 502, may be obtained from a mobile application that is executing on the respective endpoint device of the one or more endpoint devices. Further, the UDN identifier and the unique passcode may be provided to the mobile application, which provisions the one or more endpoint devices using a device provisioning protocol to connect to the UDN using the UDN identifier and the unique passcode.

In one form, the method 500 may further involve obtaining, from an authentication server, a new MAC address of the respective endpoint device. The new MAC address may be generated based on performing a MAC address rotation. The method 500 may further involve providing, to the mobile application, the new MAC address and the UDN identifier such that the mobile application updates the MAC address of the respective endpoint device associated with the UDN.

In one or more example embodiments, the respective endpoint device may be authenticated to connect to the UDN using the unique passcode instead of the MAC address.

In one form, the method 500 may further involve generating a hash of the unique passcode and providing, to an authentication server, UDN information including the hash and the UDN identifier.

In one instance, the operation 504 of generating the unique passcode may involve generating a passphrase as a function of the UDN identifier.

In another instance, the operation 504 of generating the unique passcode may involve generating a pre-shared key as a function of the UDN identifier.

Figure 6:
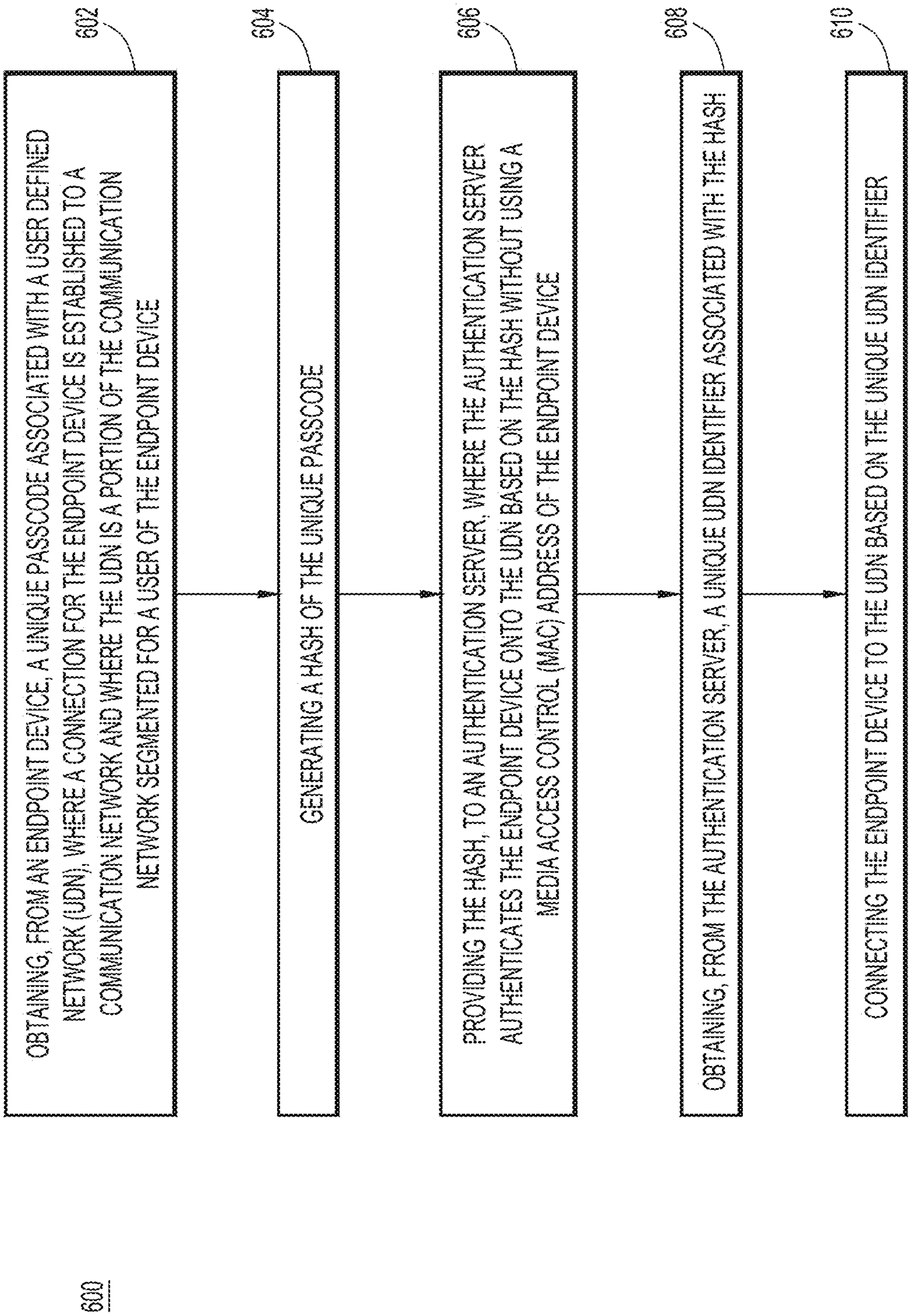
FIG. 6 is a flow diagram illustrating a method of connecting an endpoint device to the UDN based on a passcode provided by the endpoint device, according to an example embodiment.

FIG. 6 is a flowchart illustrating a method of 600 of connecting an endpoint device to the UDN based on a passcode provided by the endpoint device, according to an example embodiment. The method 600 may be performed by a network device, such as the WLC 130 of FIG. 1 or the WLC 218 of FIGS. 3 and 4.

The method 600 involves at 602, obtaining, from an endpoint device, a unique passcode associated with a user defined network (UDN). A connection for the endpoint device to a communication network is established and the UDN is a portion of the communication network segmented for a user of the endpoint device.

The method 600 further involves at 604, generating a hash of the unique passcode.

The method 600 further involves at 606, providing the hash to an authentication server. The authentication server authenticates the endpoint device onto the UDN based on the hash without using a media access control (MAC) address of the endpoint device.

The method 600 further involves at 608, obtaining, from the authentication server, a UDN identifier associated with the hash and at 610, connecting the endpoint device to the UDN based on the UDN identifier.

In one or more example embodiments, the unique passcode and the UDN identifier may be generated by a UDN service. The hash of the unique passcode is associated with the UDN identifier and is stored at the authentication server.

In one instance, the operation 606 of providing the hash may involve providing a Remote Authentication Dial-In User Service (RADIUS) message that includes the hash in a vendor payload.

In one form, the operation 608 of obtaining the UDN identifier may involve obtaining a RADIUS message having the UDN identifier as one of a plurality of pre-defined RADIUS attributes. The UDN identifier may be matched with the hash by the authentication server.

In one or more example embodiments, the operation 610 of connecting the endpoint device to the UDN may involve applying one or more traffic constraint policies associated with the UDN to one or more network packets obtained from the endpoint device.

In one instance, the unique passcode may be a passphrase generated as a function of the UDN identifier.

In another instance, the unique passcode may be a pre-shared key generated as a function of the UDN identifier.

In some instances, it may be desirable to communicate private room information, such as a room name, also referred to herein as private group information or a group identifier (ID), or a hash thereof to a WLC by an endpoint in a secure manner to facilitate joining a UDN. For example, a user (e.g., via a mobile app) may register for a UDN via a cloud portal or a splash access. The UDN may be provided via a UDN enabled Service Set Identifier (SSID). An identifier for the UDN (UDN-ID) and a hash of the group ID (room-name) can be generated via the cloud portal or splash access and delivered to the registering user using various delivery mechanisms. The group ID (room-name) can also be generated by the cloud portal based on a user identity (user-ID) of the user performing the registration for the UDN in some instances or can be created by the user through the registration for the UDN. A PSK or passphrase for the user can also be generated by the cloud portal in some instances or can be created by the user through the registration for the UDN.

The SSID for a corresponding UDN enabled SSID, the PSK (or passphrase), and the hash of the group ID can be provided to the registering user via the delivery mechanism, such as embedded within a Quick-Response (QR) code (e.g., in which the QR code can be generated using the SSID, the PSK (or passphrase) for the user and the hash of the group ID) or some other delivery mechanism.

Further, the cloud portal can generate a mapping that maps or correlates the UDN-ID to the hash of the group ID, and the mapping can be pushed to an authentication server, which can store the mapping for later use in authenticating an endpoint that seeks to connect to the UDN.

The hash of the group ID, the SSID, and the PSK (or passphrase) can then be communicated to an endpoint device (e.g., a headless device) via a user device or mobile app of the user (that obtained the information from the cloud portal) through any existing mechanism, such as via a Digital Product Passport (DPP), via a Near Field Communication (NFC) transfer, and/or the like in which the endpoint can communicate the hash of the group ID to a WLC for seeking connection to the UDN. The WLC can use the hash of the group ID to perform authentication via the authentication server for connection of the endpoint device to the UDN.

Thus, the hash of the group ID, which may also be considered a hash of the room-name, can be characterized as a hash of a passcode that can be used to onboard endpoint devices to a UDN in accordance with embodiments herein.

Figure 7:
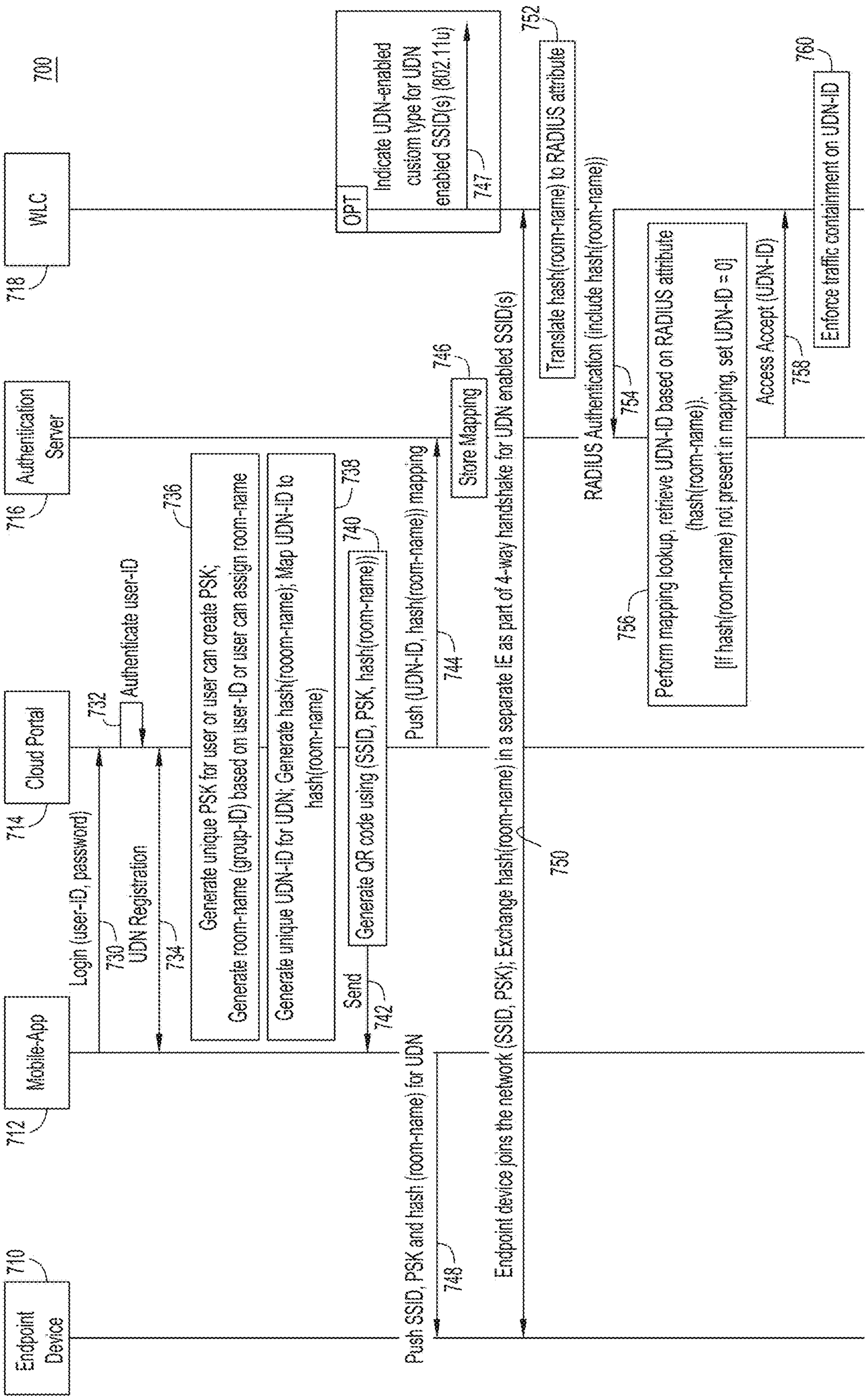
FIG. 7 is a flow diagram illustrating a UDN registration process and a process of onboarding an endpoint device onto a UDN network, according to an example embodiment.

FIG. 7 is a flow diagram illustrating process 700 for performing a UDN registration process by a user and for onboarding an endpoint device 710 to the UDN using a hash of a passcode (e.g., a hash of a room-name/group ID for a UDN) that can be delivered to the endpoint device 710, according to an example embodiment. FIG. 7 includes endpoint device 710, a mobile app 712, a cloud portal 714, an authentication server 716, and a WLC 718.

As shown at 730, consider that a user, via mobile app 212 (more specifically, via a user device on which the mobile app 712 is executing), performs a login via the cloud portal 714 using a user-ID and a password for the user for creating/registering a UDN (e.g., UDN 112). As generally shown at 732, the cloud portal can authentication the user-ID for the user using any authentication mechanisms now known in the art or hereinafter developed such as through an enterprise identity authentication service/authentication database provided via a network management service (e.g., network management service 150) using a Security Assertion Markup Language exchange for exchanging the user-ID with the enterprise identity authentication service and/or the like. The cloud portal can obtain an authentication success indication to complete the user login.

Following successful authentication of the user/user-ID, the user/mobile app 712 can complete the UDN registration process 734, which may include various operations. For example, through the UDN registration process, the cloud portal 714 can generate a unique PSK or passphrase for the user or the user can create the PSK or passphrase, as shown at 736. Although the embodiment of FIG. 7 is discussed with reference to a PSK, it is to be understood that a passphrase may be used for operations herein rather than a PSK.

Further, as shown at 736, the cloud portal can generate a room-name (group-ID) for the UDN based on the user-ID or the user can assign the room-name for the UDN. The UDN can be provided via any UDN enabled SSID facilitated via the wireless network infrastructure provided via the WLC 718, wireless APs (e.g., AP 120, not shown in FIG. 7), and a UDN service (e.g., UDN service 160, not shown in FIG. 7).

As shown at 738, the cloud portal 714 can generate a unique UDN-ID for the UDN and can generate a hash of the room-name, referred to herein using the nomenclature 'hash (room-name)'. Further, at 738, the cloud portal can generate a mapping that maps or otherwise correlates the UDN-ID to the hash of the room-name. Broadly, as discussed herein, the hash of the room-name (group ID) can also be characterized as a hash of a passcode that can be used to onboard an endpoint device to the UDN.

As shown at 740 and 742, the cloud portal 714 delivers an SSID for a UDN enabled SSID, the PSK, and the hash of the room-name to the mobile app 712, for example, by generating (as shown at 740) a QR code based on the SSID, the PSK (or passphrase), and the hash of the room-name and sending (as shown at 742) the QR code to the mobile app 712 or through any other delivery mechanism such that the mobile app 712 obtains each of the SSID, the PSK (or passphrase), hash of the room-name associated with the UDN.

The mobile app 712 can push the SSID, the PSK (or passphrase), and the hash of the room-name to the endpoint device 710, as shown at 748, for onboarding the endpoint device to the wireless network or, more specifically, to the UDN. The mobile app 712 can push the SSID, the PSK (or passphrase), and the hash of the room name using a DPP service, a Near Field Communication (NFC) service, or the like.

As shown at 744, the cloud portal 714 pushes the mapping of the UDN-ID to the hash of the room name to the authentication server 716, which the authentication server stores, as shown at 746.

As shown at 747, in some embodiments, the WLC 718 can indicate, for example to the network management service 150, a UDN-enabled custom type for the UDN enabled SSID(s) for the wireless network (e.g., for use with the IEEE 802.11u protocol). Thus, the WLC 718/wireless infrastructure can indicate the SSID(s) on which nano-segmentation (e.g., UDN) functionality is supported.

Thereafter, when the endpoint device 710 joins the wireless network within which the UDN is provided, the endpoint device 710 securely sends information about the unique private-group information (e.g., hashed private room-name/group ID) as part of a 4-way handshake performed with the WLC 718, as shown at 750, such as an Extensible Authentication Protocol (EAP) 4-way handshake.

In various embodiments, the unique private-group information (hash (room-name/group-ID) can be sent by the endpoint device via an information element (IE) or as a key distribution exchange (KDE) element through the 4-way handshake. In at least one embodiment, the hash of the room-name/group ID can be sent to the WLC 718 as part of an EAP-Identity-Response message exchanged through the 4-way handshake.

As shown at, 752, the WLC 718 translates the hash of the room-name into a RADIUS attribute for inclusion in a RADIUS authentication message sent to the authentication server 716 (e.g., as a RADIUS vendor payload, a vendor specific RADIUS attribute, or the like), as shown at 754.

At 756, the authentication server 716 performs authentication for or authenticates the endpoint device 710 for connection to the UDN created by the user/mobile app 712 by performing a lookup on mapping information stored thereat based on the hash of the room-name identified via the RADIUS attribute/payload to identify the corresponding UDN-ID for the UDN created by the user/mobile app 712. Upon validation (e.g., successful authentication/successfully identifying the UDN-ID mapped to the hash of the room-name), the authentication server 716 provides the UDN-ID to the WLC 718 via an access accept message, as shown at 758, which causes the WLC 718 to enforce traffic containment/segmentation on the UDN-ID for the endpoint device 710 (and any other endpoint device that may be associated with the UDN), as shown at 760. If a mapping of a given hash of a room-name obtained by the authentication server 716 from the WLC 718 to a given UDN-ID is not identified by the authentication server 716, the authentication server can set the UDN-ID to zero.

Similar to other techniques discussed herein, the embodiment of FIG. 7 does not depend on an endpoint device's MAC address for onboarding/connecting to a given UDN; rather, in accordance with embodiments herein, private group information, such as a hash of a room-name/group ID can be communicated to the endpoint device. Thereafter, the endpoint device can inform the wireless network infrastructure (e.g., WLC 718) about the private group via the private group information (e.g., hash of the room name/group ID) as part of a secure exchange (e.g., 4-way handshake) with the infrastructure. The WLC, or any other authenticator for an endpoint device, can indicate the private group information to an authentication server via a RADIUS attribute, such that the endpoint device. The authentication server can authenticate the endpoint device for connection/onboarding to the private group based on the private group information (e.g., hash of the room name/group ID) and independent of a unique identity of the endpoint device, such as the MAC address of the endpoint device. Upon successful validation/authentication of the endpoint device by the authentication server (based on the private group information and independent of the unique identity (e.g., MAC address of the endpoint device), the endpoint device can be onboarded to the private group.

Figure 8:
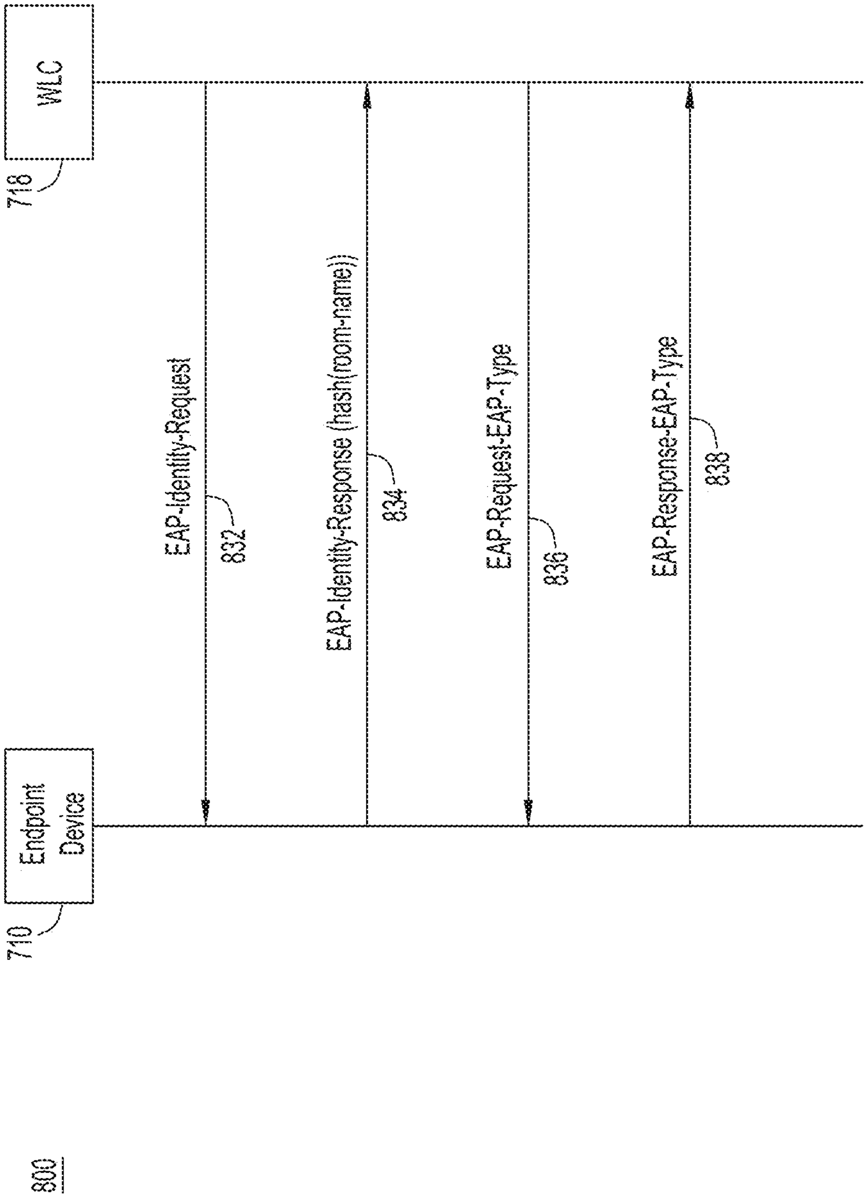
FIG. 8 is a flow diagram illustrating example details for a 4-way handshake through which an endpoint device may provide a hash of a passcode to a wireless local area network infrastructure, according to an example embodiment.

Referring to FIG. 8, FIG. 8 is a flow diagram illustrating example details for a 4-way handshake process 800 through which an endpoint device, such as endpoint device 710 may provide a hash of a passcode (e.g., hash of the room-name) to WLC 718, according to an example embodiment.

As shown in FIG. 8, consider at 832 that the 4-way handshake is initiated by the WLC 718 via an EAP-Identity-Request message being sent to the endpoint device 710. As shown at 834, the endpoint device can respond to the request with an EAP-Identity-Response message that includes the hash of the room-name (via an IE or KDE element) that is sent to the WLC 718. Per EAP standards, the 4-way handshake can be completed as shown at 836 and 838 via corresponding EAP-Request and EAP-Response messages regarding the EAP-Type for authentication of the endpoint device 710.

Upon obtaining the hash-of the room name from the endpoint device, the WLC 718 can perform a further authentication exchange with the authentication server 716 (not shown in FIG. 8), as discussed above for FIG. 7, in order to onboard/connect the device to the UDN as created by the user/mobile app 712.

Figure 9:
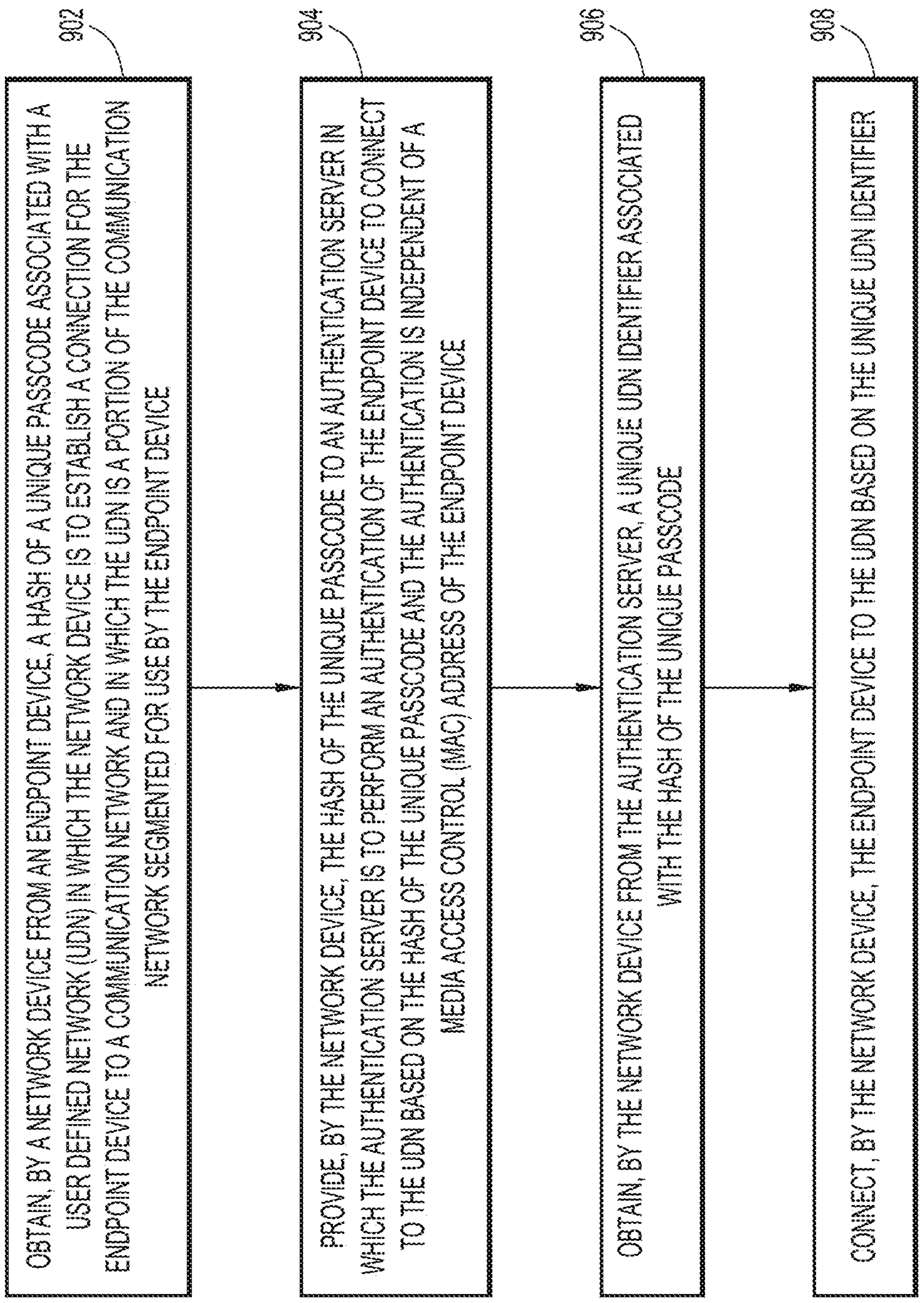
FIG. 9 is a flow diagram illustrating another method of connecting an endpoint device to a UDN, according to an example embodiment.

FIG. 9 is a flow diagram illustrating another method 900 for connecting an endpoint device to a UDN, according to an example embodiment.

As shown at 902, the method may include obtaining, by a network device from an endpoint device (e.g., by WLC 718 from endpoint device 710), a hash of a unique passcode (e.g., hash (room-name) or hash (group ID)) associated with a user defined network (UDN) in which the network device is to establish a connection for the endpoint device to a communication network and in which the UDN is a portion of the communication network segmented for use by the endpoint device.

The hash of the unique passcode can be obtained from the endpoint device via a 4-way handshake with the endpoint device. For example, the hash of the unique passcode can be included within an information element or a KDE element of a message of the 4-way handshake. The hash of the unique passcode is included within an identity response message of the 4-way handshake. A pre-shared key (PSK) or passphrase and a service set identifier (SSID) can further be obtained from the endpoint device via the 4-way handshake.

At 904, the method may include providing, by the network device, the hash of the unique passcode to an authentication server in which the authentication server is to perform an authentication of the endpoint device to connect to the UDN based on the hash of the unique passcode and the authentication is independent of a media access control (MAC) address of the endpoint device. Thus, the authentication server can authenticate the endpoint device to connect to the UDN based on the hash of the unique passcode and independent of a unique identity, such as the MAC address, of the endpoint device.

At 906, the method may include obtaining, by the network device from the authentication server, a unique UDN identifier associated with the hash of the unique passcode.

At 908, the method may include connecting, by the network device, the endpoint device to the UDN based on the unique UDN identifier.

Figure 10:
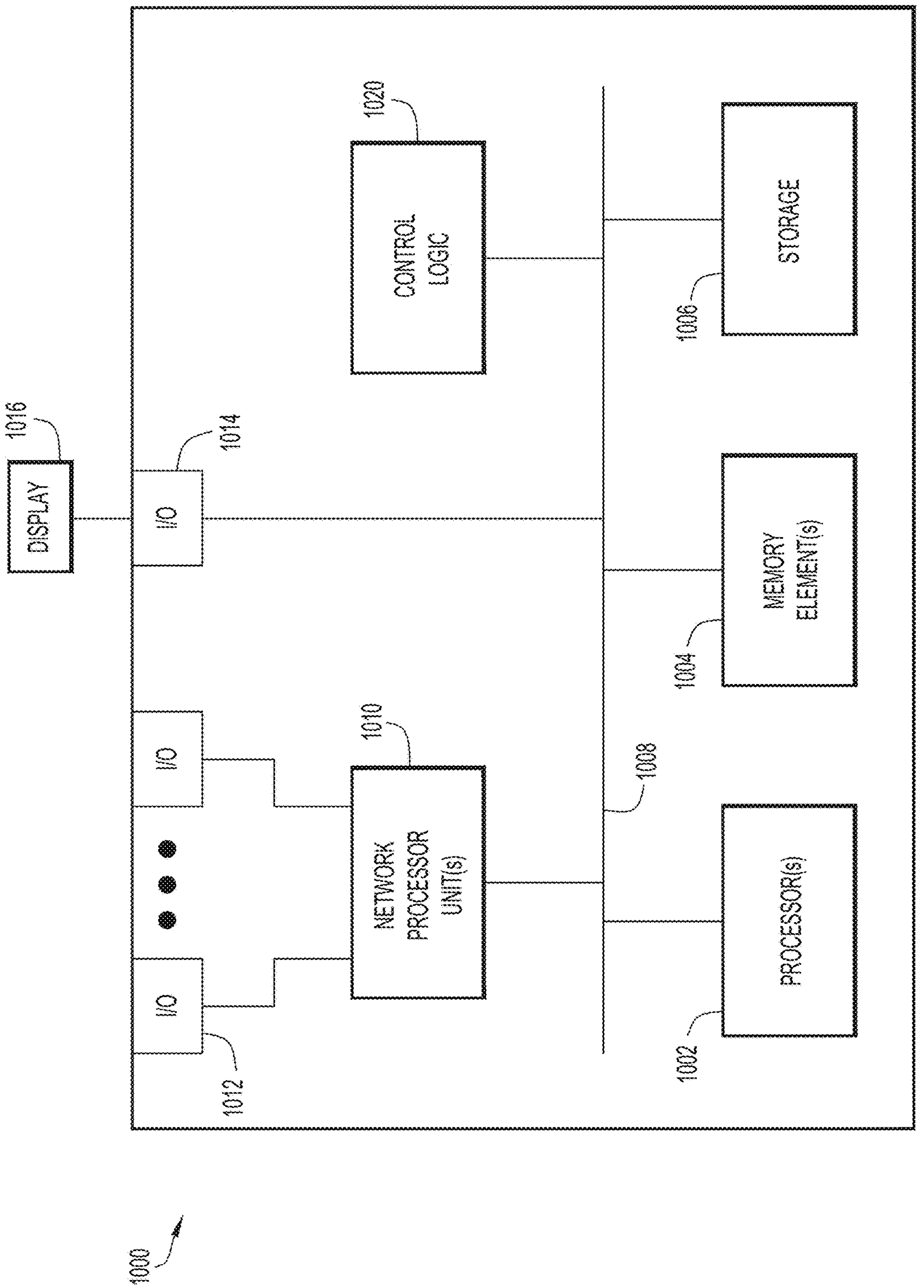
FIG. 10 is a hardware block diagram of a computing device that may perform functions associated with any combination of operations in connection with the techniques depicted and described in FIGS. 1-9, according to various example embodiments.

FIG. 10 is a hardware block diagram of a computing device 1000 that may perform functions associated with any combination of operations in connection with the techniques depicted in FIGS. 1-9, according to various example embodiments, including, but not limited to, operations of the one or more endpoint devices such as endpoint device 180 of FIG. 1, EPs 210*a-n* of FIG. 2, the first endpoint device 210*a* of FIGS. 3 and 4, or the endpoint device 710 of FIGS. 7 and 8. Further the computing device 1000 may be representative of the WLC 130, the authentication service 140, the network management service 150, or the UDN service 160 that are shown in FIG. 1. Further, the computing device 1000 may be representative of the cloud-UDN 214, the authentication server 216, the WLC 218 of FIGS. 2-4, or the user device operating mobile app 712, the cloud portal 714, the authentication server 716, or the WLC of FIGS. 7 and 8. It should be appreciated that FIG. 10 provides only an illustration of one example embodiment and does not imply any limitations with regard to the environments in which different example embodiments may be implemented. Many modifications to the depicted environment may be made.

In at least one embodiment, computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with one or more memory elements 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 1016, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a network interface to receive and send packets in a network and a processor. The processor is configured to perform various operations including obtaining, from the network interface, a registration request for establishing a user defined network (UDN) and generating a UDN identifier and a unique passcode associated with the UDN identifier. The unique passcode enables an authentication of one or more endpoint devices to connect to the UDN and the authentication is independent of a media access control (MAC) address of a respective endpoint device. The operations further include providing, to the network interface, the UDN identifier and the unique passcode such that the UDN identifier and the unique passcode are provided to the one or more endpoint devices to connect to the UDN.

In yet another example embodiment, an apparatus is provided. The apparatus includes a network interface configured to receive and send packets in a network and a processor. The processor is configured to perform various operations. The operations include obtaining, from an endpoint device, a unique passcode associated with a user defined network (UDN). The apparatus establishes a connection to a communication network for the endpoint device. The UDN is a portion of the communication network segmented for a user of the endpoint device. The operations further include generating a hash of the unique passcode and providing the hash to an authentication server. The authentication server authenticates the endpoint device onto the UDN based on the hash without using a media access control (MAC) address of the endpoint device. The operations further involve obtaining, from the authentication server, a UDN identifier associated with the hash and connecting the endpoint device to the UDN based on the UDN identifier.

In yet another example embodiment, one or more non-transitory computer readable storage media encoded with instructions are provided. When the media is executed by a processor, the instructions cause the processor to execute a method that involves obtaining a registration request for establishing a user defined network (UDN) and generating a UDN identifier and a unique passcode associated with the UDN identifier. The unique passcode enables an authentication of one or more endpoint devices to connect to the UDN. The authentication is independent of a media access control (MAC) address of a respective endpoint device. The method further involves providing the UDN identifier and the unique passcode such that the UDN identifier and the unique passcode are provided to the one or more endpoint devices to connect to the UDN.

In yet another example embodiment, one or more non-transitory computer readable storage media encoded with instructions are provided. When the media is executed by a processor, the instructions cause the processor to execute another method that involves obtaining, from an endpoint device, a unique passcode associated with a user defined network (UDN). A connection to a communication network is established for the endpoint deice. The UDN is a portion of the communication network segmented for a user of the endpoint device. The method further involves generating a hash of the unique passcode and providing the hash to an authentication server. The authentication server authenticates the endpoint device onto the UDN based on the hash without using a media access control (MAC) address of the endpoint device. The method further involves obtaining, from the authentication server, a UDN identifier associated with the hash and connecting the endpoint device to the UDN based on the UDN identifier.

In yet another example embodiment, a computer-implemented method is provided that may include obtaining, by a network device from an endpoint device, a hash of a unique passcode associated with a user defined network (UDN), wherein the network device is to establish a connection for the endpoint device to a communication network and wherein the UDN is a portion of the communication network segmented for a user of the endpoint device; providing, by the network device, the hash of the unique passcode, to an authentication server, wherein the authentication server is to perform an authentication of the endpoint device to connect to the UDN based on the hash of the unique passcode and the authentication is independent of a media access control (MAC) address of the endpoint device; obtaining, by the network device from the authentication server, a unique UDN identifier associated with the hash of the unique passcode; and connecting, by the network device, the endpoint device to the UDN based on the unique UDN identifier. Thus, the authentication server can authenticate the endpoint device to connect to the UDN based on the hash of the unique passcode and independent of a unique identity, such as the MAC address, of the endpoint device.

In one example, the hash of the unique passcode and the unique UDN identifier are generated by a UDN service and wherein the hash of the unique passcode is associated with the unique UDN identifier and stored at the authentication server.

In one example, the hash of the unique passcode is obtained from the endpoint device via a 4-way handshake with the endpoint device. In one example, the hash of the unique passcode is included within an information element or a key distribution exchange (KDE) element. In one example, the hash of the unique passcode is included within an identity response message of the 4-way handshake.

In one example, a pre-shared key or a passphrase and a service set identifier are further obtained from the endpoint device via the 4-way handshake with the endpoint device. In one example, providing the hash of the unique passcode involves providing a Remote Authentication Dial-In User Service (RADIUS) message to the authentication server that includes the hash in a vendor payload.

In one example, obtaining the unique UDN identifier involves obtaining a RADIUS message having the unique UDN identifier as one of a plurality of pre-defined RADIUS attributes, wherein the unique UDN identifier is matched with the hash by the authentication server.

In one example, connecting the endpoint device to the UDN includes: applying, by the network device, one or more traffic constraint policies associated with the UDN to one or more network packets obtained from the endpoint device.

In one example, the unique passcode is a group identifier that is generated as a function of a user identifier of a user that created the UDN or that is assigned by the user.

In yet another example embodiment, an apparatus is provided. The apparatus includes a network interface configured to receive and send packets in a network and a processor. The processor is configured to perform various operations. The operations include obtaining, by a network device from an endpoint device, a hash of a unique passcode associated with a user defined network (UDN), wherein the network device is to establish a connection for the endpoint device to a communication network and wherein the UDN is a portion of the communication network segmented for a user of the endpoint device; providing, by the network device, the hash of the unique passcode, to an authentication server, wherein the authentication server is to perform an authentication of the endpoint device to connect to the UDN based on the hash of the unique passcode and the authentication is independent of a media access control (MAC) address of the endpoint device; obtaining, by the network device from the authentication server, a unique UDN identifier associated with the hash of the unique passcode; and connecting, by the network device, the endpoint device to the UDN based on the unique UDN identifier. Thus, the authentication server can authenticate the endpoint device to connect to the UDN based on the hash of the unique passcode and independent of a unique identity, such as the MAC address, of the endpoint device.

In yet another example embodiment, a system is provided that includes the devices and operations explained above with reference to FIGS. 1-9.

The programs described herein (e.g., control logic 1020) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1006 and/or memory elements(s) 1004 can store data, software, code, instructions (e.g., processor instructions), logic, parameters, combinations thereof, and/or the like used for operations described herein. This includes the storage 1006 and/or memory elements(s) 1004 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining, by a network device from an endpoint device, a hash of a unique group identifier associated with a user defined network (UDN), wherein the network device is to establish a connection for the endpoint device to a communication network and wherein the UDN is a portion of the communication network segmented for a user of the endpoint device;

providing, by the network device, the hash of the unique group identifier, to an authentication server, wherein the authentication server is to perform an authentication of the endpoint device to connect to the UDN based on the hash of the unique group identifier and the authentication is independent of a media access control (MAC) address of the endpoint device, wherein the authentication server is to store a mapping between a unique UDN identifier for the UDN and the hash of the unique group identifier;

obtaining, by the network device from the authentication server, the unique UDN identifier associated with the hash of the unique group identifier; and connecting, by the network device, the endpoint device to the UDN based on the unique UDN identifier.

2. The method of claim 1, wherein the hash of the unique group identifier and the unique UDN identifier are generated by a UDN service.

3. The method of claim 1, wherein the hash of the unique group identifier is obtained from the endpoint device via a 4-way handshake with the endpoint device.

4. The method of claim 3, wherein the hash of the unique group identifier is included within an information element or a key distribution exchange (KDE) element.

5. The method of claim 4, wherein the hash of the unique group identifier is included within an identity response message of the 4-way handshake.

6. The method of claim 3, wherein a pre-shared key or a passphrase and a service set identifier are further obtained from the endpoint device via the 4-way handshake with the endpoint device in addition to the hash of the unique group identifier associated with the UDN.

7. The method of claim 1, wherein providing the hash of the unique group identifier involves providing a Remote Authentication Dial-In User Service (RADIUS) message to the authentication server that includes the hash in a vendor payload.

8. The method of claim 7, wherein obtaining the unique UDN identifier involves obtaining a RADIUS message having the unique UDN identifier as one of a plurality of pre-defined RADIUS attributes, wherein the unique UDN identifier is matched with the hash by the authentication server.

9. The method of claim 1, wherein connecting the endpoint device to the UDN includes:

applying, by the network device, one or more traffic constraint policies associated with the UDN to one or more network packets obtained from the endpoint device.

10. The method of claim 1, wherein the unique group identifier is generated as a function of a user identifier of a user that created the UDN or that is assigned by the user.

11. One or more non-transitory computer readable storage media encoded with instructions that, when executed by a processor, cause the processor to perform operations, comprising:

obtaining, by a network device from an endpoint device, a hash of a unique group identifier associated with a user defined network (UDN), wherein the network device is to establish a connection for the endpoint device to a communication network and wherein the UDN is a portion of the communication network segmented for a user of the endpoint device;

providing, by the network device, the hash of the unique group identifier, to an authentication server, wherein the authentication server is to perform an authentication of the endpoint device to connect to the UDN based on the hash of the unique group identifier and the authentication is independent of a media access control (MAC) address of the endpoint device, wherein the authentication server is to store a mapping between a unique UDN identifier for the UDN and the hash of the unique group identifier;

obtaining, by the network device from the authentication server, the unique UDN identifier associated with the hash of the unique group identifier; and connecting, by the network device, the endpoint device to the UDN based on the unique UDN identifier.

12. The media of claim 11, wherein the hash of the unique group identifier is obtained from the endpoint device via a 4-way handshake with the endpoint device.

13. The media of claim 12, wherein the hash of the unique group identifier is included within an information element or a key distribution exchange (KDE) element.

14. The media of claim 13, wherein the hash of the unique group identifier is included within an identity response message of the 4-way handshake.

15. A system comprising:

at least one memory element for storing data; and at least one processor for executing instructions associated with the data, wherein executing the instructions causes the system to perform operations, comprising:

obtaining, by a network device from an endpoint device, a hash of a unique group identifier associated with a user defined network (UDN), wherein the network device is to establish a connection for the endpoint device to a communication network and wherein the UDN is a portion of the communication network segmented for a user of the endpoint device;

providing, by the network device, the hash of the unique group identifier, to an authentication server, wherein the authentication server is to perform an authentication of the endpoint device to connect to the UDN based on the hash of the unique group identifier and the authentication is independent of a media access control (MAC) address of the endpoint device, wherein the authentication server is to store a mapping between a unique UDN identifier for the UDN and the hash of the unique group identifier;

obtaining, by the network device from the authentication server, the unique UDN identifier associated with the hash of the unique group identifier; and connecting, by the network device, the endpoint device to the UDN based on the unique UDN identifier.

16. The system of claim 15, wherein the hash of the unique group identifier is obtained from the endpoint device via a 4-way handshake with the endpoint device.

17. The system of claim 16, wherein the hash of the unique group identifier is included within an information element or a key distribution exchange (KDE) element.

18. The system of claim 17, wherein the hash of the unique group identifier is included within an identity response message of the 4-way handshake.

19. The system of claim 15, wherein providing the hash of the unique group identifier involves providing a Remote Authentication Dial-In User Service (RADIUS) message to the authentication server that includes the hash in a vendor payload.

20. The system of claim 15, connecting the endpoint device to the UDN includes:

applying, by the network device, one or more traffic constraint policies associated with the UDN to one or more network packets obtained from the endpoint device.

* * * * *